United States Patent
Karami et al.

(10) Patent No.: US 7,093,892 B2
(45) Date of Patent: Aug. 22, 2006

(54) MOTOR VEHICLE ROOF WITH A ROOF OPENING AND A WIND DEFLECTOR

(75) Inventors: Jadi Karami, Ottobrunn (DE); Martin Kiedl, Munich (DE); Christian Gallner, Holzkirchen (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 10/949,809

(22) Filed: Sep. 27, 2004

(65) Prior Publication Data

US 2005/0093344 A1 May 5, 2005

(30) Foreign Application Priority Data

Sep. 26, 2003 (DE) ................. 103 44 884

(51) Int. Cl.
*B60J 7/22* (2006.01)
(52) U.S. Cl. ........................................ 296/217
(58) Field of Classification Search ............. 296/217
See application file for complete search history.

(56) References Cited

U.S. PATENT DOCUMENTS

| 6,357,823 B1 | 3/2002 | Birndorfer et al. |
| 6,626,486 B1 | 9/2003 | Lane |

FOREIGN PATENT DOCUMENTS

| DE | 39 13 567 A1 | 10/1990 |
| DE | 197 01 479 A1 | 7/1998 |
| DE | 197 14 492 A1 | 10/1998 |
| DE | 198 09 943 A1 | 9/1999 |
| DE | 101 46 285 A1 | 10/2002 |
| DE | 10137650 | * 2/2003 |
| DE | 102 10 617 C1 | 12/2003 |
| EP | 0 931 683 A2 | 7/1999 |
| FR | 2 810 592 A1 | 12/2001 |
| JP | 403045427 | * 2/1991 |

* cited by examiner

*Primary Examiner*—Dennis H. Pedder
(74) *Attorney, Agent, or Firm*—David S. Safran

(57) ABSTRACT

Motor vehicle roof with a roof opening, a movable closing element to selectively close or at least partially clear the roof opening, a wind deflector in a front edge area of the roof opening and which is movable between lowered and fully raised positions, and a positioning device for setting intermediate positions of the wind deflector which has a holder which engages the wind deflector and a driven displacement mechanism for vertically displacing the wind deflector into the intermediate positions. The adjustment mechanism has a guide element which is driven by the drive into motion along the wind deflector with an inclined guideway along which an engagement element which is connected to the holder is movably guided. The engagement element is supported on a body-mounted carrier such that it can be moved with respect to the carrier only normal to the direction of motion of the guide element.

28 Claims, 11 Drawing Sheets

MOTOR VEHICLE ROOF WITH A ROOF OPENING AND A WIND DEFLECTOR

BACKGROUND OF THE INVENTION

1. Field of Invention

This invention relates to a motor vehicle roof with a roof opening and a wind deflector, a closing element which can be displaced to selectively close or at least partially clear the roof opening, in which the wind deflector is located in the area of the front edge of the roof opening and can be moved between a lowered and a fully raised position, and a positioning device for setting intermediate positions of the wind deflector which has a holder which engages the wind deflector and an movement mechanism which is driven by a drive which displaces the holder to dictate the intermediate positions of the wind deflector.

2. Description of Related Art

Generic motor vehicle roofs are known in which the wind deflector is mounted to be able to pivot around a roof-mounted axle which runs in the transverse direction of the roof and is elastically pretensioned in the direction of the completely raised position, the wind deflector being lowered against the pretensioning force when the closing element or the cover is being closed by means of the cover drive, and the holder which engages the wind deflector acting as a hold-down in the intermediate positions.

This generic motor vehicle roof is described, for example, in published German Patent Application DE 199 58 742 A1 and corresponding U.S. Pat. No. 6,357,823, the positioning device being located in the area of the front edge of the roof opening and being provided with a lever mechanism which has two mirror-symmetrical positioning rockers, one end of which forms a stop for the wind deflector and the other end of which is coupled to a control lever which sits on the driven shaft of the actuator. The comparatively large installation space required is the disadvantage in this approach.

Published German Patent Application DE 101 42 047 A1 and corresponding U.S. Pat. No. 6,626,486 discloses a similar construction, the stop for the wind deflector being determined by a wire of a shape memory alloy. Published French Patent Application FR 2 810 592 A1 describes a motor vehicle roof in which the wind deflector position can be set via a sheathed cable which engages the wind deflector. Published German Patent Application DE 101 46 285 A1 discloses a motor vehicle roof in which the stop for the raising of the wind deflector takes place via lateral control levers which are actuated by the cover. A similar motor vehicle roof is also described in published German Patent Application DE 198 09 943 A1.

Published European Patent Application EP 0 931 683 A2 discloses a motor vehicle roof in which the movement of the wind deflector takes place via a wind deflector servomotor which drives a pinion which is connected to the wind deflector via a drive cable.

Published German Patent Application DE 197 01 479 A1 describes a motor vehicle roof in which the wind deflector is displaced via a lateral control cam which is driven by the servomotor to be able to move in the lengthwise direction of the roof and which is made as a guide band, for example, in the form of a vertically arranged toothed belt.

Published German Patent Application DE 197 14 492 A1 describes a motor vehicle roof in which the wind deflector can be pivoted around a pivot axis which runs on its front end in the transverse direction of the roof, a guide element which is provided with a inclined guide path being permanently connected to the wind deflector and a guide pin which is driven into displacement motion in the transverse direction of the roof being engaged in the guide path such that, during the displacement motion of the guide pin in the transverse direction of the roof, pivoting of the guide element and thus of the wind deflector takes place.

Published German Patent Application DE 102 10 617 A1 describes a motor vehicle roof in which the stop for the raising motion of the wind deflector can be adjusted by means of one end of a control lever which is made as a rocker and the other end of which is controlled via a separate motor by a guide slot which runs in the lengthwise direction of the roof.

Published German Patent Application DE 39 13 567 A1 describes a motor vehicle roof in which a wind deflector is provided in the area of its top edge with additional elements which are supported on the wind deflector such that, if necessary, they can be pushed up over the top edge of the wind deflector, this taking place by a respective guide pin which is driven by a drive in the transverse direction of the roof fitting into an inclined guide path on the respective additional element by sliding.

The aforementioned motor vehicle roofs have different disadvantages. In part they do not allow any actuation of the wind deflector independent of the cover and the positioning device of the wind deflector requires a large amount of installation space or does not ensure reliable control of the wind deflector or requires relatively many components.

SUMMARY OF THE INVENTION

A primary object of this invention is to devise a motor vehicle roof with a roof opening and a wind deflector, in which adjustment of intermediate positions of the wind deflector is as flexible as possible, the amount of installation space required and the number of required parts will be kept as small as possible and a durable structure will be achieved.

This object is achieved in accordance with the invention by the displacement mechanism having a guide element which is driven by the drive into motion along the wind deflector with a inclined guideway along which an engagement element which is connected to the holder is movably guided, the engagement element being supported on a body-mounted carrier such that it can be moved with respect to the carrier only normal to the direction of motion of the guide element, or by a kinematic reversal of this approach.

In the approach in accordance with the invention, it is advantageous that by means of the positioning device, the position of the wind deflector can be easily varied, especially depending on the driving speed and/or the degree of opening of the closing element, in order to achieve optimum reduction of wind noise and humming noise, and the positioning device can be made very compact with little demand for installation space and especially can be integrated in the front, transversely running part of the roof frame for the closing element. Furthermore, the number of additional parts which is necessary for the positioning device can be kept very small and the positioning device can be made very durable and thus reliable.

The invention is explained in detail below by way of example using the accompanying drawings.

DETAILED DESCRIPTION OF THE INVENTION

Figure 1:
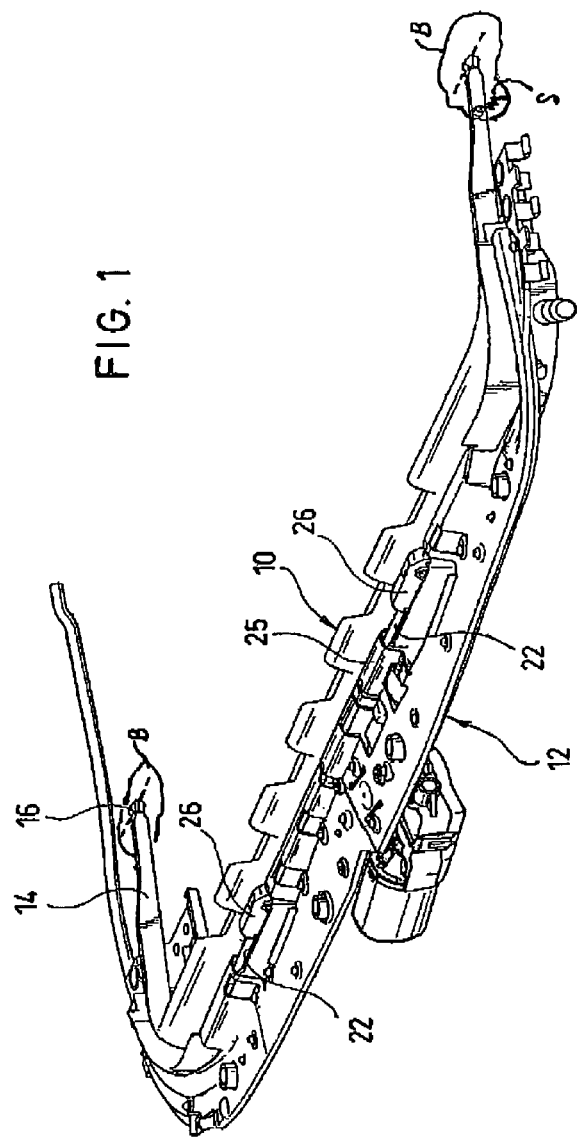
FIG. 1 is a schematic perspective view of only the wind deflector and the front roof frame area of a motor vehicle roof in accordance with the invention as seen from obliquely forward.
Figure 9:
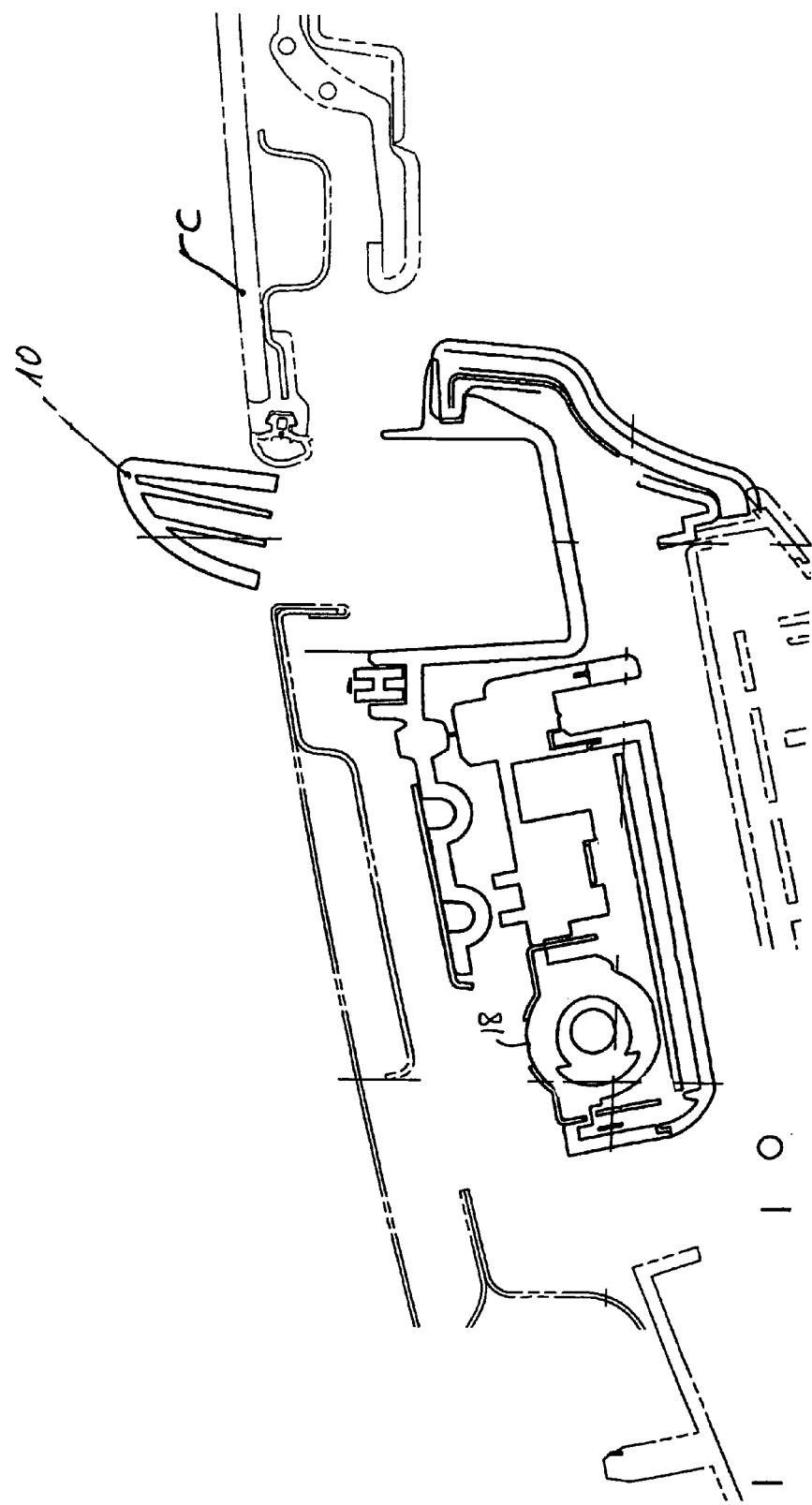
FIG. 9 is a sectional view of a portion of a vehicle roof in which the wind deflector arrangement of the present invention has been installed, with the movable cover panel in a partially open position.
Figure 10:
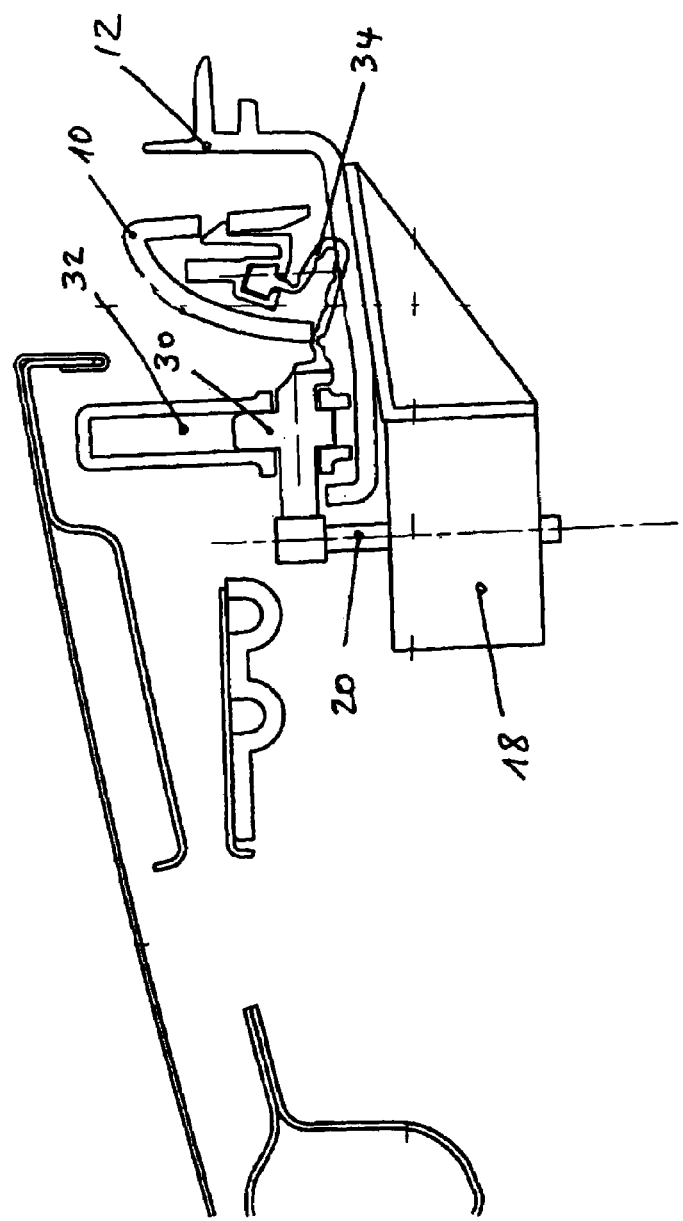
FIG. 10 is a view similar to that of FIG. 5, but showing the guide pin in its lowered position with the wind deflector fully retracted.

FIG. 1 shows a wind deflector 10 and of the forward part of a transversely extending roof frame 12 for a motor vehicle roof, the motor vehicle roof having a roof opening (see, FIG. 9) which can be selectively closed or can be at least partially cleared by a movable closing element C (see, FIGS. 9 & 10). The wind deflector 10 and the illustrated part of the roof frame 12 are located in the area of the front edge of the roof opening, the roof frame being used as a support for the closing element. The wind deflector extends over the entire width of the roof opening.

The closing element C can be, for example, the cover of a sliding roof, sliding and lifting roof, externally guided sliding roof or spoiler roof or the louvers of a louvered roof.

The wind deflector 10 comprises a front wind deflector surface and two lateral arms 14 which are supported on their back end at 16 to be able to pivot around a fixed axis which runs in the transverse direction of the roof and is formed by an axle shown in broken lines in FIG. 1 and is mounted to the vehicle body B. In a conventional manner, the wind deflector 10 is pretensioned by means of a spring element S in the area of the lateral arms 14 into the fully raised position in which the front wind deflector surface is raised up above the height of the fixed roof surface, in order to eliminate or reduce wind noise and humming noise which occur when driving with the closing element opened. When the closing element is closed, the wind deflector is pressed down or lowered against the spring pretensioning into a storage space which is provided in the roof frame, this action taking place by actuating the side arms 14 when the closing element is being closed.

The fully raised position of the wind deflector 10 is dictated by a fixed stop (not shown). However, generally, it is desirable under certain circumstances to set the wind deflector 10 also in intermediate positions between the lowered and the fully raised position. Thus, conventionally, humming noise occurs mainly in the lower speed range (for example, up to 100 km/h; 60 mph) so that, in this range, generally the fully raised position of the wind deflector 10 is desirable, while at higher speeds hardly any humming noise occurs so that it is not necessary in this speed range to fully raise the wind deflector.

Figure 2:
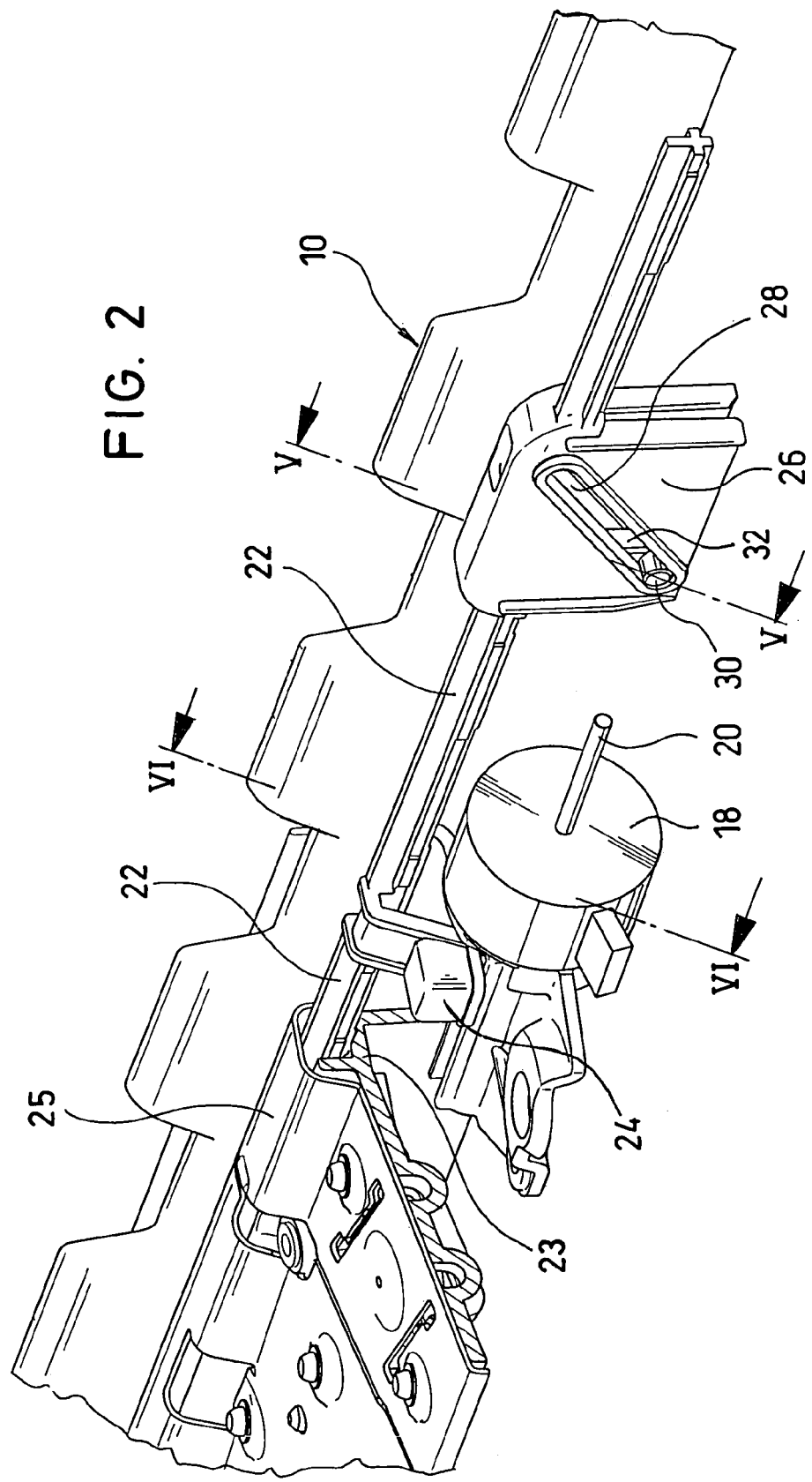
FIG. 2 shows an enlarged view of a partial area of the motor vehicle roof from FIG. 1, the roof frame being in part cut free and the wind deflector being shown in the lowered position.
Figure 3:
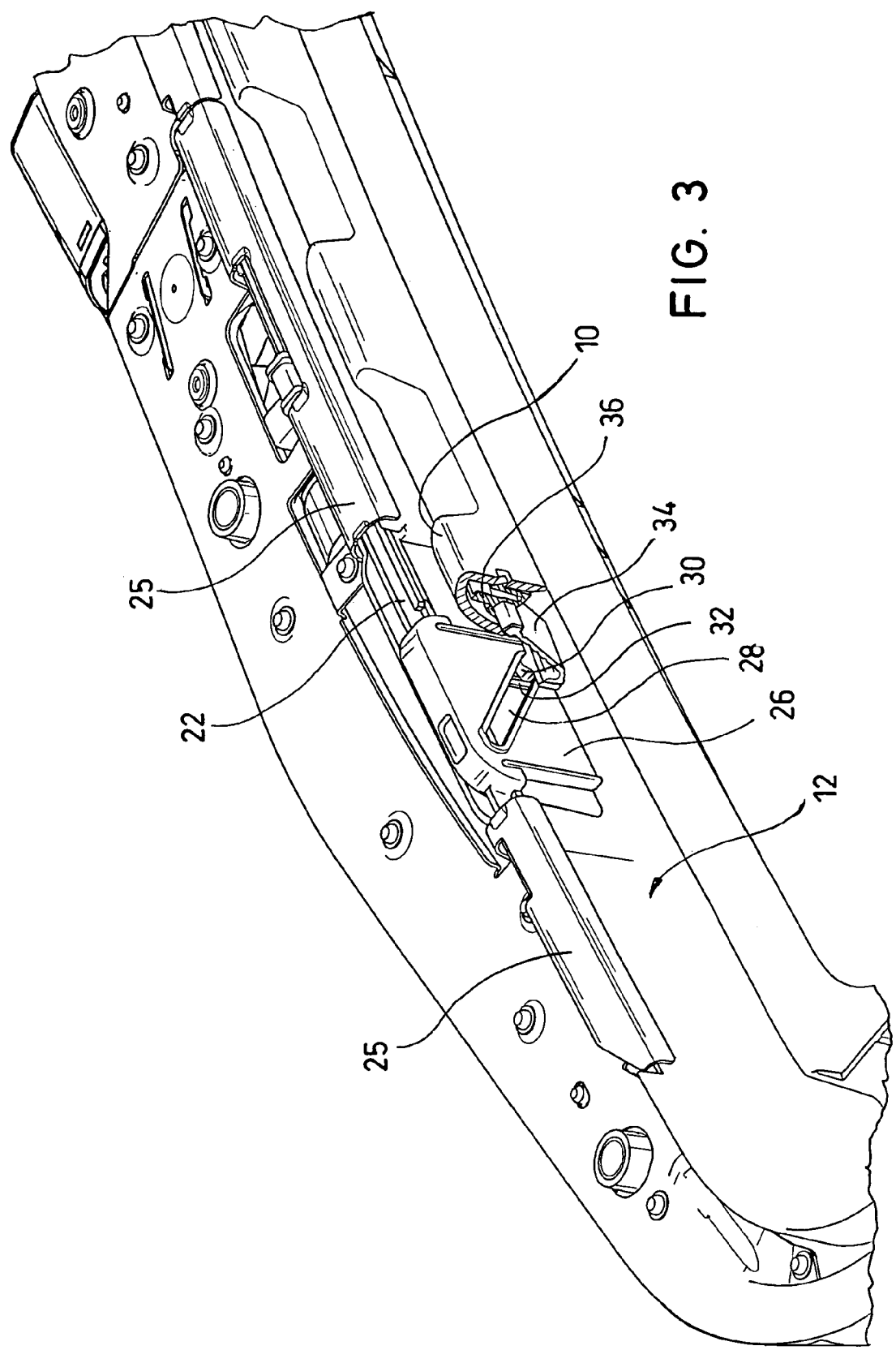
FIG. 3 is a schematic perspective view of the area shown in FIG. 2, but viewed from obliquely behind and with the wind deflector being partially cutaway.
Figure 4:
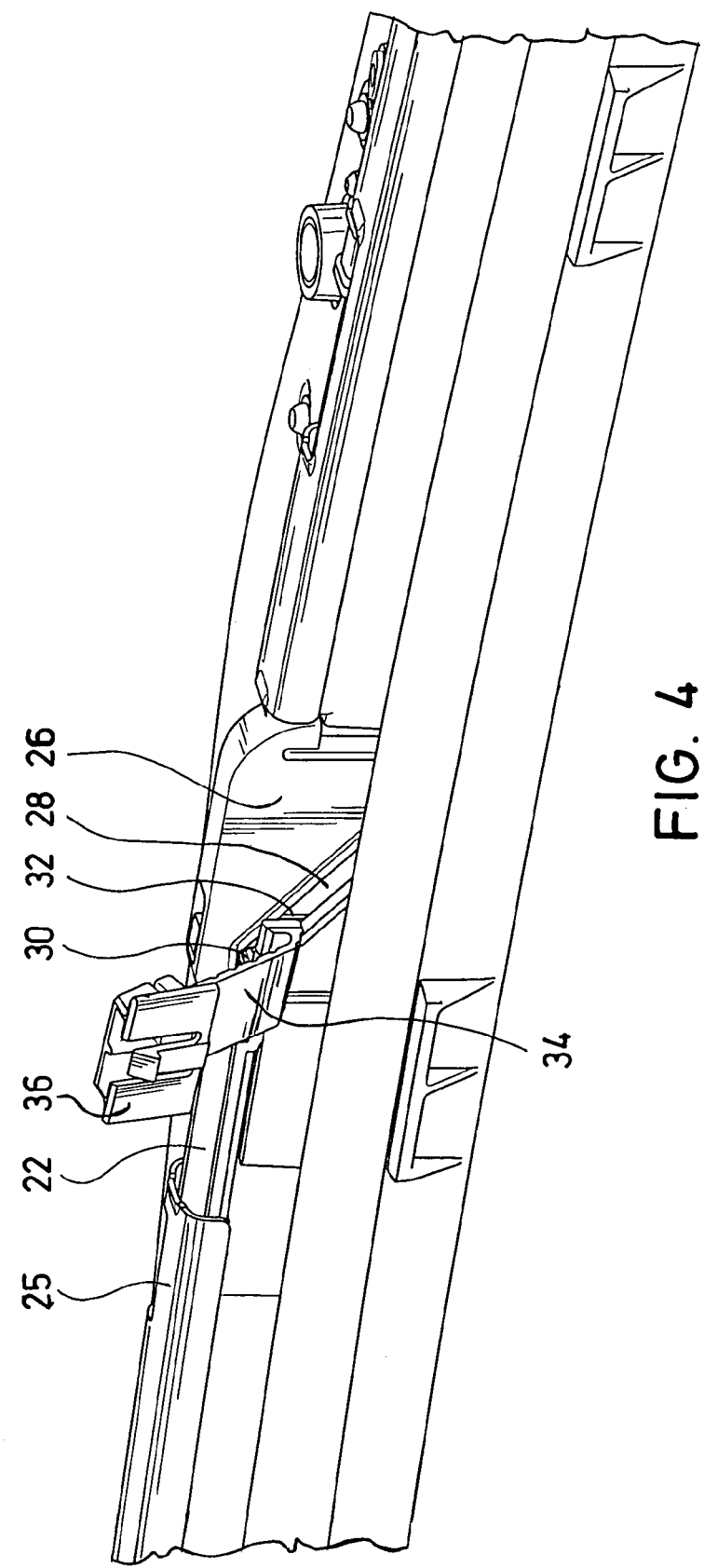
FIG. 4 is a view similar to FIG. 3, but from a somewhat different perspective, the positioning device for the wind deflector being shown in the position in which the wind deflector is fully raised.

To implement these intermediate positions, there is the positioning device which is described below and which has a servomotor 18 which, for example, can be made as a rotary motor which drives a spindle 20, which is movable in the transverse direction of the roof, and an element which is stiff in tension-compression, which runs in the manner of a rod in the transverse direction of the roof and which is driven by means of a coupling arrangement 24 by the spindle 20 into displacement motion in the transverse direction of the roof and is movably guided in the transverse direction of the roof on a guide rail 23 which is formed on the roof frame 12 and which is provided with a cover 25. The positioning device furthermore comprises a guide element 26 which forms part of an element 22 which is stiff in tension-compression or is permanently connected to it and has an inclined guide slot 28 into which an engagement element which is made as a guide pin or bolt 30 fits, see especially FIG. 2. The guide pin 30 is furthermore guided in a guide path 32 which is made in the roof frame 12 and which runs in the vertical direction of the roof, i.e., essentially perpendicular to the direction of motion of the guide element 26, such that it can be moved only perpendicularly to the direction of motion of the guide element 26 (i.e., in the illustrated example, only in the vertical direction of the roof), see FIGS. 2, 3, 5 and 7. The guide pin 30 is connected at its back by means of a flexible element 34, which can be made, for example, as a band, to a hold-down 36 which is permanently engaged with the wind deflector 10, see especially FIG. 5.

Instead of being made as a rotary motor with a downstream arrangement for conversion of a rotary motion into a linear motion, the servomotor can also be made as a linear motor.

The manner of operation of the positioning device for the wind deflector 10 explained below. For example, if lowering of the wind deflector 10 is desired proceeding from the fully raised position with the closing element opened, for example, because a given speed threshold is exceeded, the servomotor is triggered accordingly into rotary motion which causes displacement of the spindle 20 in the transverse direction of the roof. In addition or alternatively, to produce a positioning which is dependent on the driving speed, the control of the servomotor 18 can take place, for example, also depending on the degree of opening of the closing element.

Figure 5:
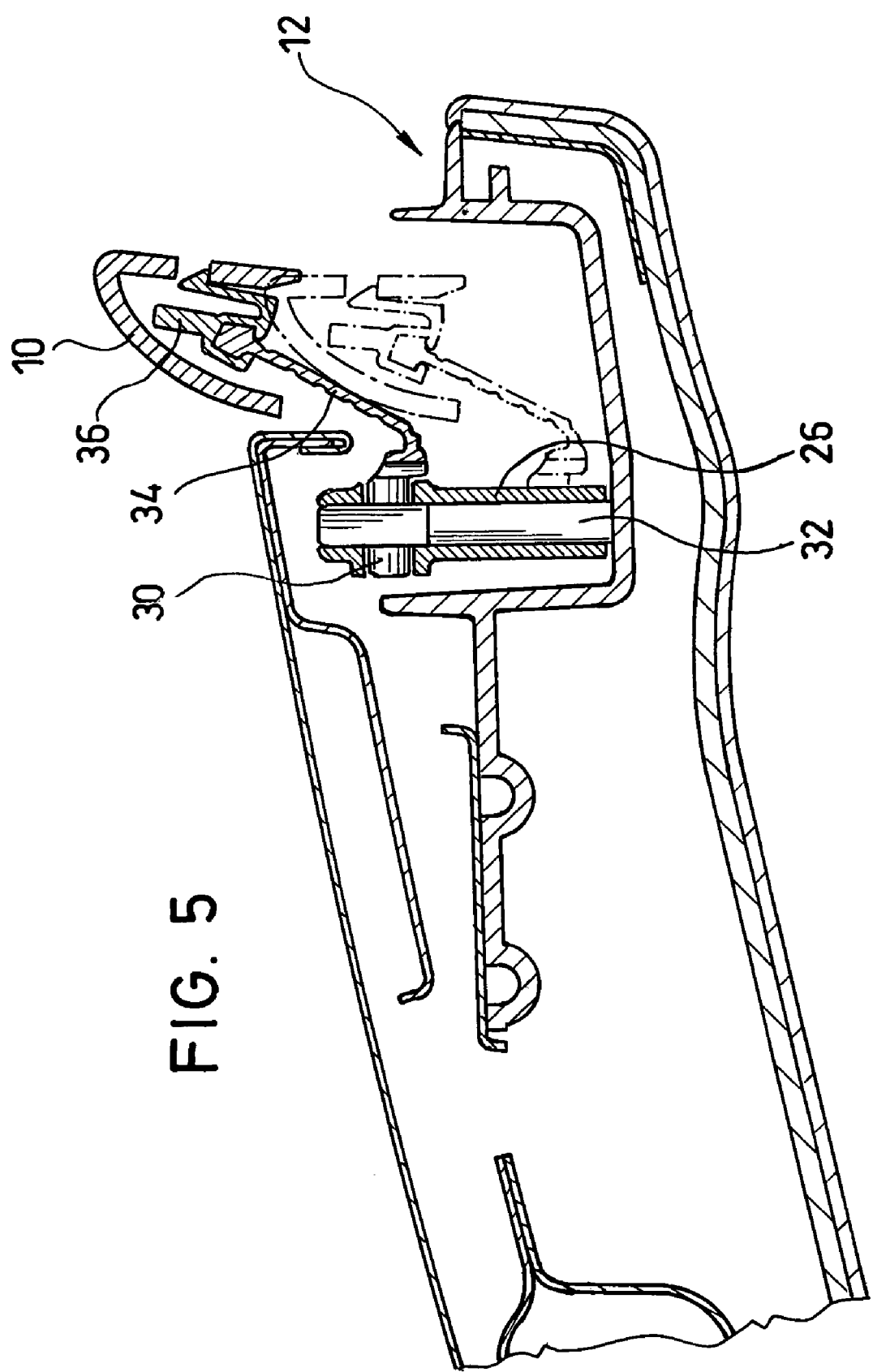
FIG. 5 is a sectional representation in the lengthwise direction of the roof in the area of line V—V in FIG. 2, but the guide pin, in contrast to FIG. 2, being shown in its upper position.
Figure 6:
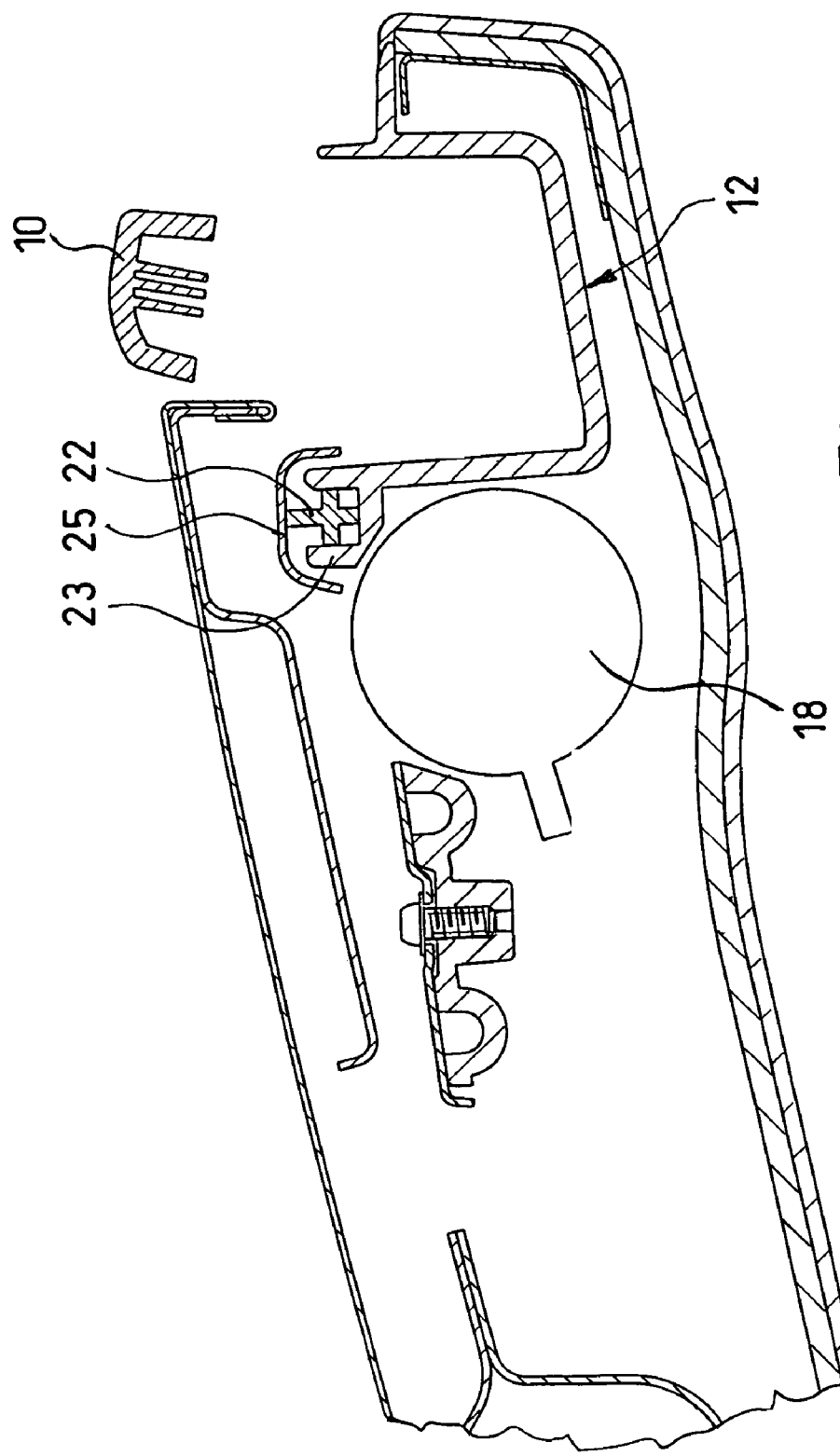
FIG. 6 is a sectional representation along line VI—VI in FIG. 2.
Figure 7:
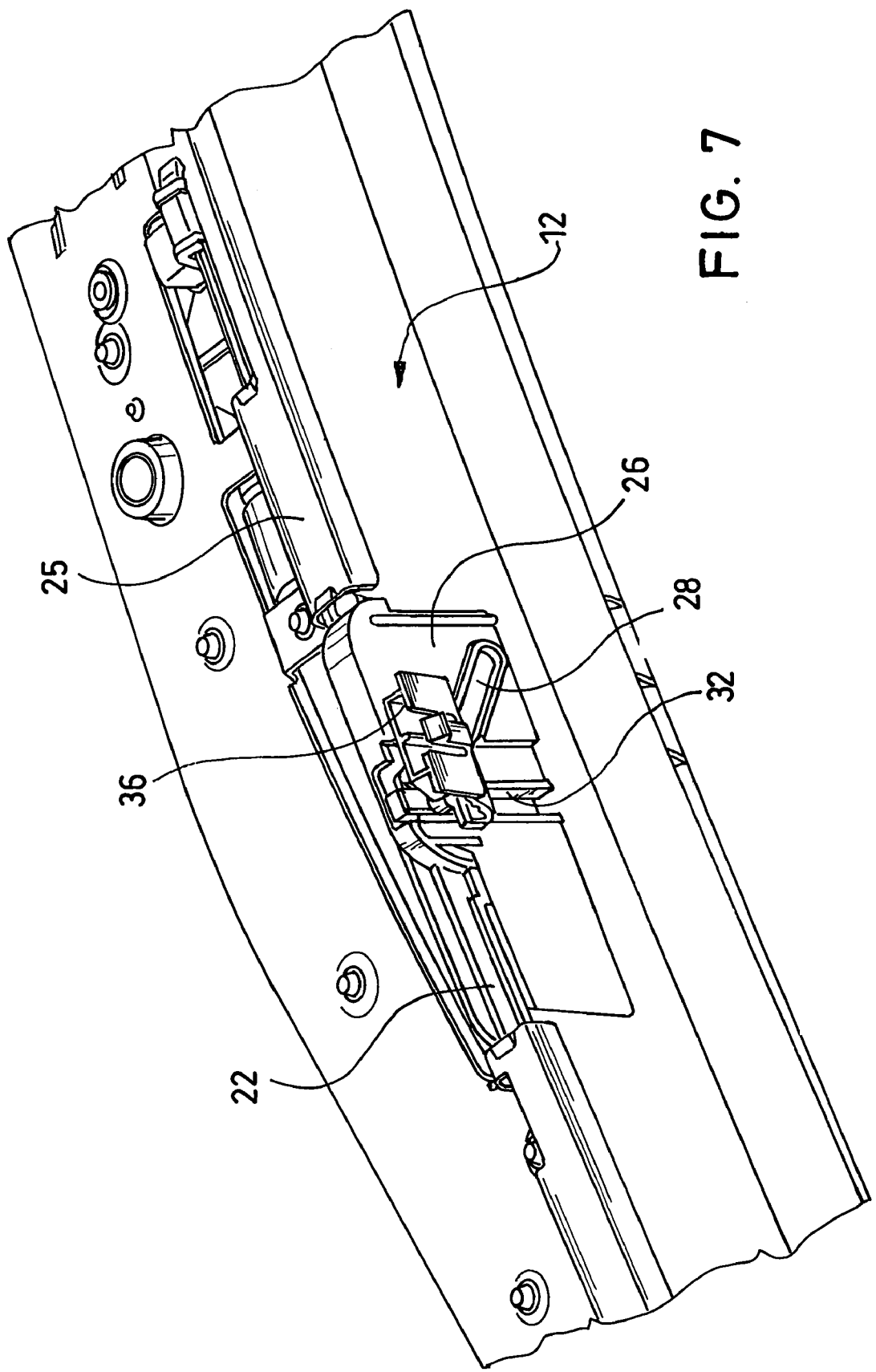
FIG. 7 is a view similar to FIG. 3, part of the guide element being cutaway and the positioning device being shown in the position in which the wind deflector is fully raised.
Figure 8:
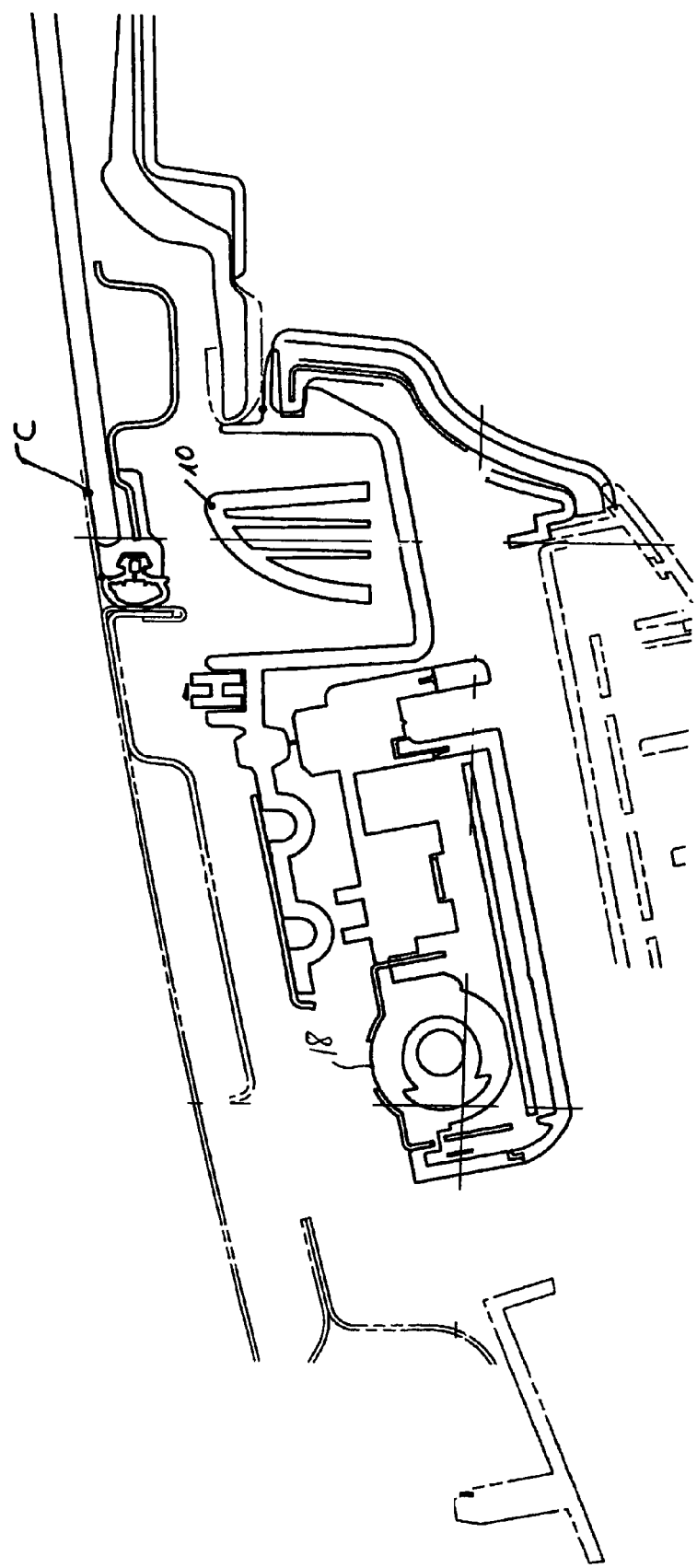
FIG. 8 is a sectional view of a portion of a vehicle roof in which the wind deflector arrangement of the present invention has been installed, with the movable cover panel in its closed position.

Via the coupling element 24, the displacement motion of the spindle 20 is converted into a corresponding displacement motion of the element 22 which is stiff in tension-compression in the transverse direction of the roof, the guide element 26 also being pushed accordingly in the transverse direction of the roof. As a result of the fitting of the guide pin 30 into the guide path 28 and the inclination of the guide path 28 (which is made in this example as a straight path with a uniform pitch) depending on the direction of rotation of the motor 18, lowering or raising of the guide pin 30 takes place, the latter moving up or down in the roof frame-mounted guide and guide path 32. FIG. 5 shows the guide pin 30 in its top position, i.e., in the position in which the wind deflector 10 is fully raised, in addition the hold-down 36 being shown with the flexible band 34 also in the position which is lowered with respect to the fully raised position.

The flexible element 34 provides for a connection between the guide pin 30 and the hold-down 36 which is stiff in tension, but not in compression. When the guide pin 30, as a result of the displacement motion of the guide element 26, moves down in the roof frame-mounted guide path 32, accordingly, by means of the coupling formed by the flexible element 34 which is stiff in tension, the hold-down 36, and thus the wind deflector 10, is pulled down a corresponding distance in a manner overcoming the pre-tensioning of the spring of the wind deflector 10. In this way, the wind deflector 10 can be lowered from the fully raised position, selectively into intermediate positions, by means of the servomotor 18. However, it is not necessary for the wind deflector to be able to be moved into the fully lowered position by means of the servomotor 18 since this generally takes place anyway when the closing element is closed by actuation of the side arms 14 (in this case, flexibility of the connecting element 34 is necessary). The aforementioned fully raised position is shown in FIG. 5.

As shown in FIG. 1, in a symmetrical arrangement in the vicinity of the side edge, on each of the two sides, there is a respective one of the guide elements 26, both of which are jointly driven by the servomotor 18, and by which a respective one of the hold-downs 36 engages points which are spaced in the transverse direction of the roof.

Preferably, the entire positioning device is located in the area of the front part of the roof frame 12 and is at least partially integrated into it. The roof frame acts as a body-mounted carrier for the positioning device.

The wind deflector 10, instead of the embodiment which is shown in FIG. 1 with two side arms 14, can be made alternatively as a wind deflector louver which can be raised at its rear edge by pivoting around an axis of rotation which runs in the transverse direction of the roof on or near the front end of the wind deflector louver. In this case, in the vicinity of the rear edge of the wind deflector louver, the hold-downs feasibly engage the louver in order to lower it into the intermediate positions.

Figure 11:
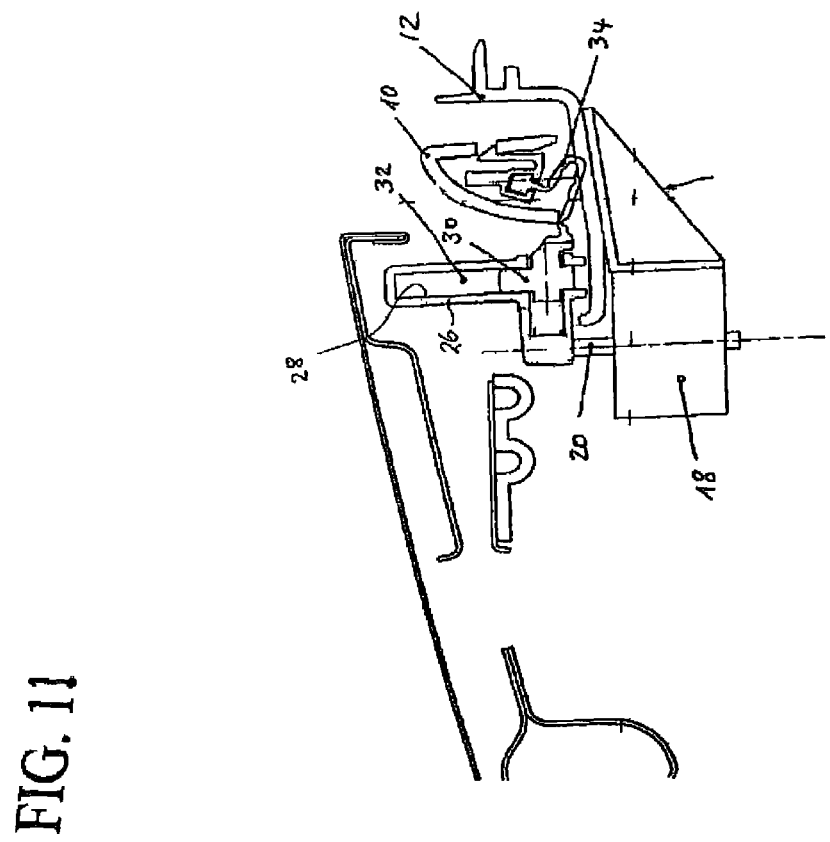
FIG. 11 schematically shows an embodiment having a kinematic reversal of the positioning mechanism.

Furthermore, kinematic reversal of the positioning mechanism described previously is also possible, i e, where the engagement element as opposed to the guide element is driven along the wind deflector and the guide element as opposed to the engagement element is connected to the holder and moves vertically to raise and lower the wind deflector. Thus, such a case, then, the guide element (in the illustrated example, the guide element 26) would not be provided with a guide path, but would be made as an engagement element, especially as a guide pin, while the element which can be moved in the vertical direction of the roof (in this example, the guide pin 30) is provided with an inclined guide path or guideway with which the engagement element is movably engaged. This kinematic reversal of the positioning mechanism is shown in FIG. 11, where the guide element is connected to the drive 18 carried by the body-mounted carrier 12.

It goes without saying that the guideway need not necessarily be made as a guide slot, but can also be made in some other way, for example, as a guide crosspiece, the engagement element accordingly not necessarily having to be made as a guide pin, for example, being made as a sliding block which extends around the guide crosspiece.

Furthermore, it is noted that the illustrated positioning mechanism could be used not only for lowering the wind deflector, but also for raising it. In this case, the connection between the engagement element and the hold-down would have to be made not only stiff in tension, but also stiff in compression. Then, the positioning mechanism could also be used fundamentally to reach the end positions of the wind deflector.

What is claimed is:

1. Motor vehicle roof, comprising:
   with a roof opening,
   a closing element which is movable to selectively close and at least partially clear the roof opening,
   a wind deflector located in an area of a front edge of the roof opening and which is movable between a lowered position and a fully raised position, and
   a positioning device for setting intermediate positions of the wind deflector between the lowered and fully raised positions, the positioning device having a holder which engages the wind deflector and an displacement mechanism which is driven by a drive and by means of which the holder is vertically movable to dictate the intermediate positions of the wind deflector,
   wherein that the displacement mechanism has a guide element which is driven by the drive in a direction of motion along the wind deflector,
   wherein the guide element has an inclined guideway along which an engagement element which is connected to the bolder is movably guided, and
   wherein the engagement element is supported on a body-mounted carrier for movement with respect to the carrier only in a direction normal to the direction of motion of the guide element.

2. Motor vehicle roof as claimed in claim 1, wherein the guideway is a guide path.

3. Motor vehicle roof as claimed in claim 2, wherein the guide path is a guide slot and the engagement element is a guide pin which is guided in the guide slot.

4. Motor vehicle roof as claimed in claim 2, wherein the engagement element is movably guided on the body-mounted carrier in a guide path which runs in the vertical direction of the roof.

5. Motor vehicle roof as claimed in claim 1, wherein the guide element is driven to move in a transverse direction of the roof along a front area of the wind deflector.

6. Motor vehicle roof as claimed in claim 1, wherein the wind deflector is pre-tensioned toward the fully raised position.

7. Motor vehicle roof as claimed in claim 6, wherein the wind deflector is lowerable by closing the closing element against the pretensioning force.

8. Motor vehicle roof as claimed in claim 6, wherein the holder acts as a hold-down against the pre-tensioning force to dictate the intermediate positions of the wind deflector.

9. Motor vehicle roof as claimed in claim 8, wherein the holder is connected to the engagement element by a flexible element.

10. Motor vehicle roof as claimed in claim 9, wherein the flexible element forms a connection which is stiff in tension, but not in compression.

11. Motor vehicle roof as claimed in claim 10, where in the flexible element is a band.

12. Motor vehicle roof as claimed in claim 1, wherein the wind deflector extends over the entire width of the roof opening.

13. Motor vehicle roof as claimed in claim 1, wherein the wind deflector is pivotable around a body-mounted axle which runs in the transverse direction of the roof.

14. Motor vehicle roof as claimed in claim 12, wherein the axle lies on a rear end of the wind deflector.

15. Motor vehicle roof as claimed in claim 1, wherein the guide element is connected to a drive by an element which is stiff in tension-compression and which is guided along a guide on the body-mounted carrier.

16. Motor vehicle roof as claimed in claim 15, wherein the guide element is of a one-piece construction which includes the element which is stiff in tension-compression.

17. Motor vehicle roof as claimed in claim 1, wherein the drive has a servomotor with a downstream arrangement for conversion of a rotary motion into a linear motion.

18. Motor vehicle roof as claimed in claim 17, wherein the drive is formed by a spindle which is driven by a rotary motor.

19. Motor vehicle roof as claimed in claim 18, wherein the guide element is connected to a drive by an element which is stiff in tension-compression and which is guided along a guide on the body-mounted carrier; and wherein the spindle is connected to the element which is stiff in tension-compression by a coupling element.

20. Motor vehicle roof as claimed in claim 1, wherein the drive is triggered depending on at least one of driving speed and degree of opening of the closing element.

21. Motor vehicle roof as claimed in claim 1, wherein there are at least two displacement mechanisms and two holders, the at least two displacement mechanisms being driven by a common drive.

22. Motor vehicle roof as claimed in claim 21, wherein the holders engage at points which are spaced in the transverse direction of the roof.

23. Motor vehicle roof as claimed in claim 22, wherein the points at which the holders engage are in lateral edge areas of the wind deflector.

24. Motor vehicle roof as claimed in claim 1. wherein the entire positioning device is located in the area of the front edge of the roof opening.

25. Motor vehicle roof as claimed in claim 24, wherein the body-mounted carrier is a front section of a frame which is located below the roof opening and which runs in the transverse direction of the roof.

26. Motor vehicle roof as claimed in claim 25, wherein the positioning device is integrated at least in part into the body-mounted carrier.

27. Motor vehicle roof as claimed in claim 26, wherein the closing element is a cover.

28. Motor vehicle roof as claimed in claim 13, wherein the wind deflector is made as a wind deflector louver which can be raised at its rear edge.

\* \* \* \* \*